United States Patent Office 2,831,046
Patented Apr. 15, 1958

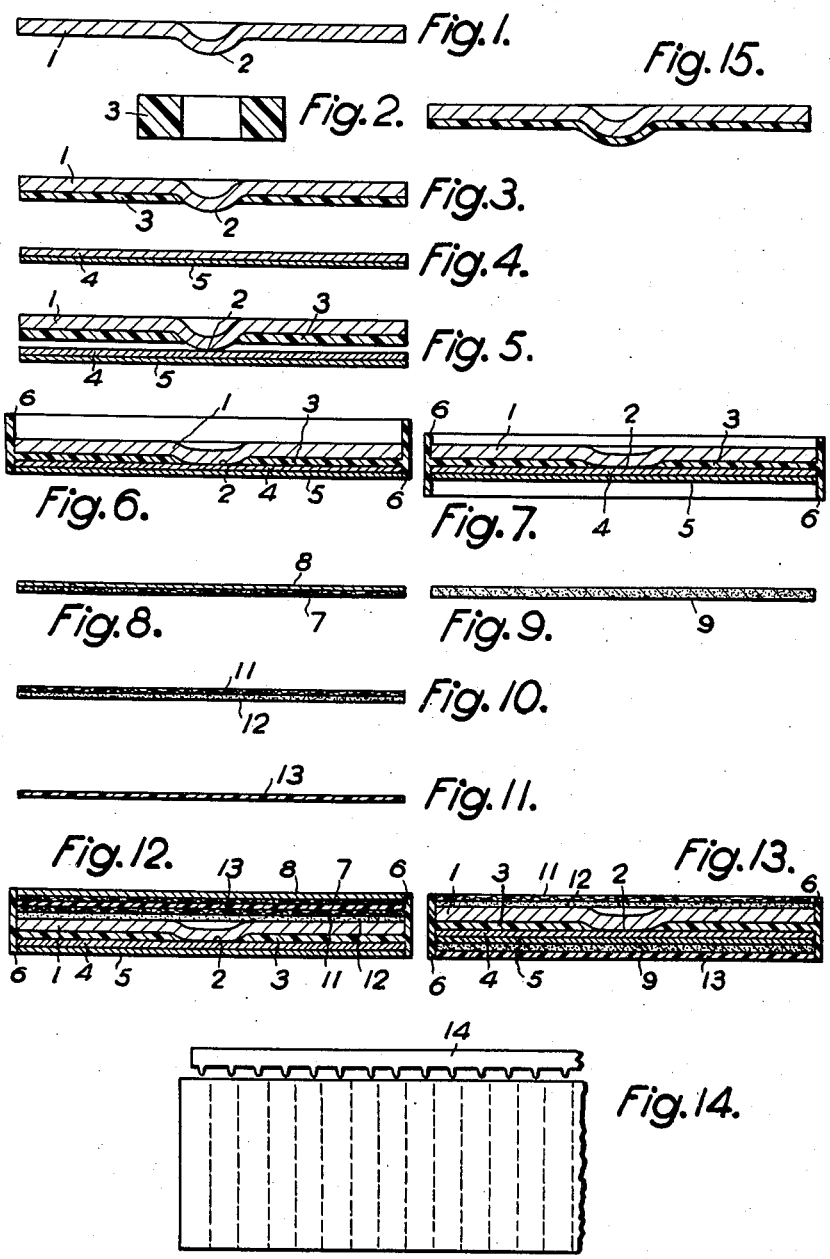

2,831,046

LAYER TYPE DRY BATTERIES

Alfred Linton, West Kingsway, Dundee, Scotland, assignor to Burndept Limited, London, England, a British company Application September 7, 1955, Serial No. 532,935

2 Claims. (Cl. 136—175)

This invention concerns the manufacture of dry batteries of the layer type.

With a view to ensuring good connection between neighbouring cells while interposing a long leakage path between the electrolyte of one cell and that of the next, contact is made between cells by means of a two-part metal connector, the two parts making contact only at the middle and being elsewhere spaced apart, and the space between them is filled by plastic insulation from which a cup is formed to contain the remaining elements of the cell. The invention also includes a method of so making batteries.

The invention is illustrated by the accompanying drawings of which:

Figures 1 to 6, 8 and 10 to 12 show the several elements of one unit of a battery and the stages of their assembly, Figures 7, 9 and 13 show alternatives to Figures 6, 8 and 12.

Figure 14 illustrates the introduction of electrolyte into a battery, and

Figure 15 shows an alternative to Figure 1.

In order that the parts of the metal connector may contact in the middle and elsewhere be spaced apart to accommodate plastic between them, one or both of them must be generally convex on the contacting surface. In the construction illustrated one part only is made convex and that by a boss formed in its centre. Figure 1 shows in cross-section a disc of steel 1 which is stamped from thoroughly degreased, shot blasted thin sheet, a boss 2 being formed in the middle of it.

It should be understood that the exigencies of reproduction make it necessary to exaggerate the thickness of the disc 1 and of other parts hereinafter described; the drawings, therefore, cannot accurately represent the proportions of the parts nor such changes of proportions as occur in the course of manufacture. Some dimensions are named hereinafter as an example and guide, but not by way of limitation.

An injection-moulded calot 3 of polythene, shown in section in Fig. 2 in the form of a ring of internal diameter greater than that of the boss 2 and external diameter less than that of the disc 1 is placed around the boss and moulded on to the disc as shown in Fig. 3 leaving at least the summit of the boss exposed; heating to 200° C. for a couple of minutes suffices for this preliminary coating of the metal. Steel is chosen because polythene will adhere strongly to it, and polythene, preferably in the form of the plastic sold under the trade name alkathene, because of the facility with which the sealing of one cell to the next can be effected as described below.

Another disc 4 of the same diameter as the first is stamped flat from steel of less thickness, zinc plated as indicated at 5; for this purpose shim steel will serve; for the bossed disc deep drawing steel is desirable.

As an indication of proportions it may be taken that the discs of Figs. 1 and 4 are about one inch in diameter the disc 1 0.01" in thickness and the disc 4 0.005"; the calot 3 may initially be ¾" in external diameter, ⅓" in internal diameter and 0.1" thick.

A bossed disc 1 and a flat disc 4 are then put together, the convex face of 1 to the steel face of 4, and the boss of the one is spot welded to the middle of the other, as seen in Fig. 5, the polythene calot softening and spreading over the adjacent surfaces of the discs, not necessarily with the precision suggested by Fig. 5. The unit so formed is then heated on a hot plate, transferred to a press and the polythene is formed into a cup (Fig. 6) or double cup (Fig. 7), by impact extrusion; that is to say it not only fills the space between the two discs 1 and 4 still remaining after the boss 2 has been nearly flattened, but also forms a cylindrical rim 6 extending beyond the thickness of the steel on one or both sides of the unit.

The anode of the cell is completed by applying to the zinc plating 5 a zinc-coated disc of bilulous paper, shown in section in Fig. 8, made by coating the paper 7 with a suspension of zinc powder 8 in starch; or by applying a pellet 9 (Fig. 9) pressed from zinc powder. Alternatively cadmium may replace zinc.

The cathode is similarly made by coating a bibulous sheet 11 with a slurry of the cathode material 12 in powder form in a solution of sodium alginate, and the coated side 12 is applied to the bossed steel disc 1 which serves as a current collector. Still better conductivity may be obtained by coating the cathode material upon iron gauze equivalent to 200 B. S. S.

If the plastic cup is double, one side will contain the anode of one cell and the other side the cathode of the next cell and its bibulous sheet, Fig. 13; if the cup is simple both anode and cathode discs will be placed in it with the anode next the bibulous sheet of the cathode (Fig. 12). Thus Figs. 12 and 13 each represent one unit of a battery but neither is by itself a complete cell, though every cell element is represented in each.

Either electrode, or both in the case of a double cup, may be assembled with the connector unit in the press which forms the cup. In any case there is interposed between the anode and cathode a disc 13 (Fig. 11) of porous polyvinylchloride such as that sold under the trade name Porvic.

The required number of cells or cell units made as above described is assembled in a pile, and the polythene cups are sealed together by rolling the pile under a hot bar (Fig. 14). Each cell is then punctured from its edge, for instance by the comb 14, and the battery is filled with electrolyte by the vacuum process. The filling punctures are then sealed by local heating, or by sheathing the battery in a tube of polyvinylchloride.

Various modifications of this preferred process are possible and have their advantages. The deep drawing steel sheet from which the bossed discs are made may be coated with 200 grade alkathene to a thickness of five thousandths of an inch as a preliminary step (Fig. 13), prior to applying a calot as above described; this gives better adhesion but may involve subsequently baring the boss for welding. The flat steel disc may be plated with cadmium instead of zinc. The whole battery may be sealed into a block or thick casing of polythene; in this case the punctures are kept open by inserting pins during the moulding of the casing.

The invention is applicable to dry cells of most types, whether the electrodes be zinc and manganese-di-oxide, or mercuric oxide and zinc, or silver chloride and magnesium, or oxide of silver and zinc, or any other combination suited to the purpose in view. The invention is specially of value in the making of batteries which have a long shelf life and can maintain a steady voltage while delivering a large current.

I claim:

1. A method of making a dry battery which comprises the steps of stamping two steel discs of the same diameter, making at least one of them convex, coating the convex surface of at least one of them with polythene leaving the summit of the convexity bare, welding said discs together at their middle, subjecting them to heat and pressure in a mould to cause the polythene to assume cup form, completing the battery unit by assembling in the polythene moulding an anode element, a cathode element and an electrolyte-holding element, and assembling a plurality of such units in a pile.

2. A method according to claim 1 comprising the further step of melting together the contacting edges of adjacent cups.

References Cited in the file of this patent

UNITED STATES PATENTS

| | | |
|---|---|---|
| 2,620,369 | Daniel | Dec. 2, 1952 |
| 2,679,548 | Raag | May 25, 1954 |
| 2,699,461 | Wilke | Jan. 11, 1955 |